Patented May 19, 1931

1,805,799

UNITED STATES PATENT OFFICE

HENRY K. BENSON, OF SEATTLE, WASHINGTON

PROCESS FOR MAKING SULPHITE PULP FROM DOUGLAS FIR AND OTHER RESINOUS CONIFERS

No Drawing.   Application filed July 27, 1929. Serial No. 381,679.

My invention relates to a chemical treatment of pulp chips of Douglas fir and other resinous conifers whereby they can be used in the sulfite process for making pulp.

It is well known that certain resinous woods, such as Douglas fir, cannot be employed directly for the production of sulfite pulp. On the one hand, it has been found that when Douglas fir wood, previously extracted with alcohol-benzene solvents for the removal of resins, is cooked under identical conditions as for spruce, hemlock, etc., the removal of noncellulose material is only partial. It is thus demonstrated that Douglas fir contains certain organic components other than resins which are insoluble in sulfite acid cooking liquor and which cannot be removed along with the lignin in the cooking process. Such insoluble compounds produce discoloration and weaken the pulp to such an extent as to make it noncommercial.

On the other hand, it has been found that pretreatment with hot fixed alkali, although successful in removing the resins, introduces another adverse condition in reacting with noncellulose material, during the preheating, to form insoluble compounds which cannot be removed subsequently by the sulfite cooking liquor. Although this method has often been tried experimentally, it is nowhere in use commercially due to the inferior quality of the resulting pulp.

It is also a matter of common knowledge that cold volatile alkali is effective in the removal of resins but such a process hitherto has not been economical due to the necessity of finely subdividing the wood by mechanical action in order that penetration of the volatile alkali can be obtained. Such mechanical crushing adds to the cost and weakens the final pulp, thus making the process noncommercial.

If volatile alkali is used under pressure at too high temperatures, the process is also adversely affected in that alteration of both cellulose and of noncellulose components may occur and further that upon release of such pressure from the hot batch, decomposition occurs of the volatile alkali resinates and other compounds, precipitating them within the pulp chips and contaminating the resulting pulp from the sulfite cooking to such an extent as to make it of inferior quality.

The essential factor in my process is the discovery of a temperature that is least favorable to such alteration of the components, that will not cause decomposition of the reacting products, that will make it possible to secure sufficiently rapid penetration and that will make it of practical use.

For these purposes I treat the pulp chips with a dilute volatile alkali liquor at a temperature below the decomposition point of cellulose, viz., below 150° C., and above the decomposition point of the volatile alkali salts as measured at ordinary atmospheric pressure, viz, above 70° C. The temperature I have found most practicable for quickness of penetration and the other purposes above stated is substantially 100° C. By circulating a dilute solution of ammonium hydroxide at this temperature and under the pressure developed in the closed system, I have secured an almost complete removal of the resins contained in Douglas fir together with an equal or greater amount of nonresinous material, which by chemical tests is shown to be of an acidic nature, resulting, when treated with fixed alkali, in the formation of colored solutions resembling dye solutions. Successful operation of my process depends upon the constant control of temperature to avoid the decomposition of the volatile alkali salts. This is attained by allowing the solution to cool, during the latter part of the process, to substantially 70° C. before its release from the digester and washing the pulp with water at the same temperature.

The application of my discovery to the process of making pulp from Douglas fir chips may be better noted by a description of the steps followed throughout the process. After the pulp chips are placed in the digester, the latter is closed and, by the usual venting system for the displacement of air, hot ammonium hydroxide solution is continuously circulated over the chips. After substantially complete extraction of resins, tannins, coloring matter, etc., is effected, the heat is shut off and the circulating ammonia salt solutions are allowed to cool substantially below 70° C. The chips still in the digester are next washed with warm water at or below the temperature cited. The sulfite acid cooking liquor is next added and the cook completed in the usual way.

As the result of experimental batches, I have found that when pulp chips have been thus subjected to the action of ammonium hydroxide or other volatile alkali and then cooked with the usual cooking liquors under the usual conditions of concentration, temperature, pressure and time, the resulting pulp shows that the pretreatment with ammonium hydroxide was a true noncellulose part lignin removal; that chips thus pretreated required less cooking time with the normal cooking liquor; that the pulp prepared from such pretreated chips was substantially free from coagulated resinous and other non cellulose matter; that when subjected to the proper cooking, it has the same or greater strength than the unextracted pulp; and that it consisted of substantially pure cellulose, requiring a very low bleach consumption for the final product.

What I claim is as follows:

1. The improvement in processes of pretreatment of Douglas fir and other resinous coniferous chips with volatile alkali to eliminate resins, coloring matter and other noncellulose materials contained therein so that the chips can subsequently be treated with sulphite solutions to manufacture pulp, comprising the circulation over uncrushed chips in enclosed systems of volatile alkali aqueous solutions at temperatures of 70–150° C., the subsequent substantial cooling of the solutions before release is made of pressure, and the draining and washing of the chips substantially at 70° C.

2. The improvement in processes of pretreatment of Douglas fir and other resinous coniferous chips with volatile alkali to eliminate resins, coloring matter and other noncellulose materials contained therein so that the chips can subsequently be treated with sulphite solutions to manufacture pulp, comprising the circulation over uncrushed chips in enclosed systems of ammonium hydroxide solutions at temperatures of 70–150° C., the subsequent substantial cooling of the solutions before release is made of pressure, and the draining and washing of the chips substantially at 70° C.

3. The improvement in processes of pretreatment of Douglas fir and other resinous coniferous chips with volatile alkali to eliminate resins, coloring matter and other noncellulose materials contained therein so that the chips can subsequently be treated with sulphite solutions to manufacture pulp, comprising the circulation over uncrushed chips in enclosed systems of dilute volatile alkali aqueous solutions at temperature substantially at 100° C., the subsequent substantial cooling of the solutions, substantially to 70° C., before release is made of pressure, and the draining and washing of the chips substantially at 70° C.

HENRY K. BENSON.